350-361 SR
OR 3,544,964
SEARCH ROOM 3,544,964

APPARATUS FOR REPRODUCING TELEVISION PICTURES

Filed March 11, 1968

3 Sheets-Sheet 1

Inventors
Rudolf Waser
Hans Ott
By Pierce, Scheffler & Parker
Attorneys

Dec. 1, 1970 R. WASER ET AL 3,544,964

APPARATUS FOR REPRODUCING TELEVISION PICTURES

Filed March 11, 1968 3 Sheets-Sheet 2

Inventors
Rudolf Waser
Hans Ott

By Prince, Schaffler & Parker
Attorneys

Inventors
Rudolf Waser
Hans Ott
By Pierce, Scheffler & Parker
Attorneys

United States Patent Office 3,544,964
Patented Dec. 1, 1970

3,544,964
APPARATUS FOR REPRODUCING TELEVISION PICTURES
Rudolf Waser, Regensdorf, Zurich, and Hans Ott, Watt-Regensdorf, Zurich, Switzerland, assignors to Eidophor A.G., Glarus, Switzerland
Filed Mar. 11, 1968, Ser. No. 711,960
Claims priority, application Switzerland, Mar. 17, 1967, 3,898/67
Int. Cl. G02f *1/08*
U.S. Cl. 350—161 8 Claims

ABSTRACT OF THE DISCLOSURE

Apparatus for reproducing television pictures by means of a Schlieren optical system includes a light-modulating medium deformable by a video-modulated electron beam. The optical system has input and output masks of an alternate bar and slit configuration, and when the medium is undeformed the input slits are imaged on the output bars to prevent light transmission to a projection lens. The bars are wider than the slit images thereon and the latter are asymmetrically disposed with reference to the longitudinal centre lines of the bars so that, upon deformation of the medium, light is preferentially deflected past one edge of each bar. In a modification the other edge of each bar is formed as a transparent prism so that light falling thereon due to deformation of the medium and light deflected past the one edge above-mentioned are brought to a common focus by the projection lens.

Figure 1:
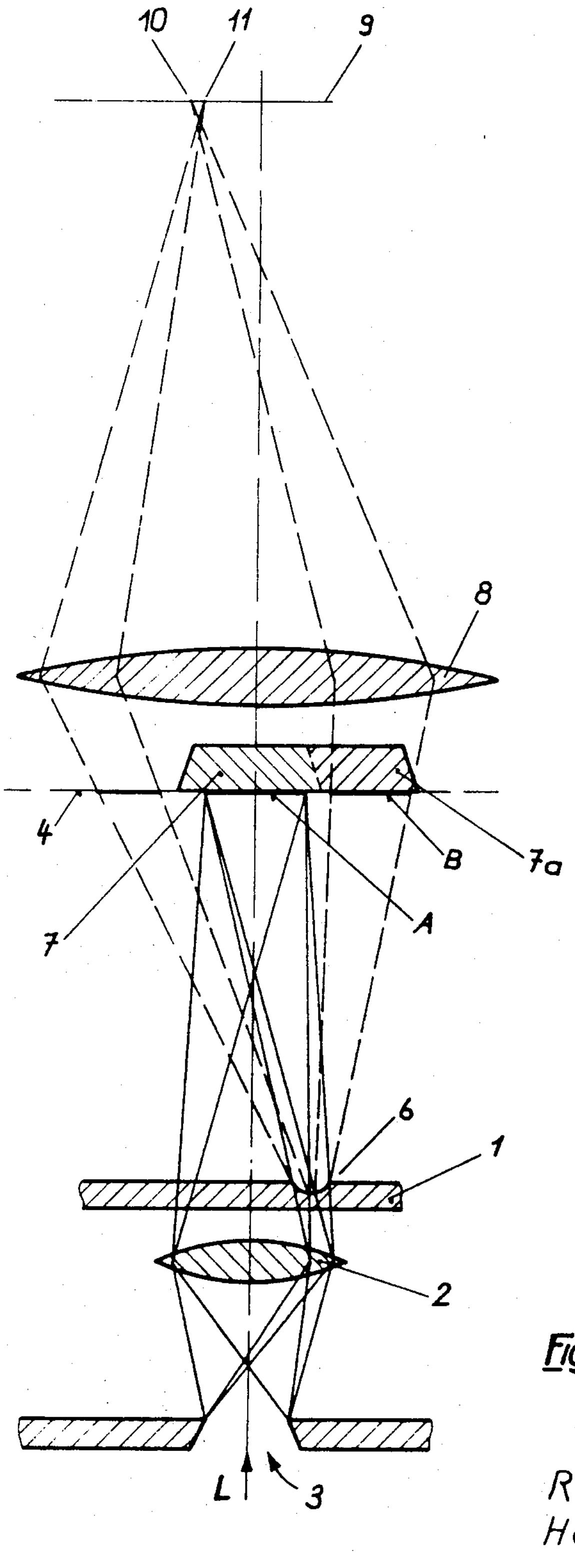

This invention relates to apparatus for producing images from a deformable, light-modulating medium by means of Schlieren optics. The invention finds particular application to the reproduction of a televised picture.

It is known to reproduce television pictures by means of a light source and a light-modulating film in a Schlieren-optical system having input and output masks each comprised of alternate slits and bars. A scanning electron beam deforms the surface of the modulating film in accordance with the television video signal by depositing electric charges on the film. The bars of the output mask intercept the bands of light produced by the slits of the input mask when the modulating film is undeformed, i.e. when the televised picture is dark. When the film is deformed the light falling on the output bars is deflected past the edges of the bars where it is collected by an objective lens and focused on a screen.

Apparatus of the kind outlined in the preceding paragraph is described more fully in U.S. Pat. Nos. 2,391,451 and 2,927,959. In such apparatus the electron beam deposits electrons on a modulating film which creates a locally varying electrostatic charge depending in magnitude upon the electron current, the speed of scan and the focusing of the beam. The resultant locally varying electrostatic forces on the surface of the modulating film produce a corresponding locally varying degree of surface deformation. Optically the deformed modulating film thus functions as a phase grating and the information deposited thereon by the scanning electron beam can be reproduced in the form of an optical image by the Schlieren optical system.

Each deformed point on the surface of the modulating film has the shape of a small radially symmetrical crater-like depression. Since only that part of the light deflected by the modulating film which by-passes one side or other of the output bars can reach the projection screen, the projection of the annular deformation on the screen consists of tne two arcs situated symmetrically on each side of the projection of the longitudinal centre line of the bars. If a string of such point-like deformations spaced no further apart than is necessary to prevent mutual interference is in alignment with the longitudinal centre line of a bar, then the projection appearing on the screen will be a double line, each line being composed of a series of consecutive arcs. The creation of these double lines is undesirable because the impression they give to a viewer is one of fuzziness and of insufficiently sharp definition.

It is therefore the object of the present invention to suppress the appearance of these undesirable double lines.

The present invention now provides apparatus for producing images from a deformable, light-modulating medium by means of Schlieren optics, comprising a source of light; means cooperable with said source to produce bands of light for transmission to a deformable light-modulating medium; a plurality of spaced bars for selectively passing light modulated by said medium; means disposed in the light path between said light-band-producing means and said source to focus said light bands upon different ones of said bars when said medium is undeformed; and a projection arrangement responsive to light passed by said bars when said medium is deformed to produce an image coresponding to the deformations of said medium, wherein each of said bars has a width greater than that of the band of light falling thereon when said medium is undeformed, thereby preventing the transmission of light to the projection arrangement, and each band of light falls on its respective bar asymmetrically with respect to the longitudinal centre line of the bar, as seen looking in the direction of the light falling on the bar.

In one embodiment of the apparatus defined in the foregoing paragraph, the bars of the output mask are entirely opaque. Upon deformation of the light-modulating medium, light is deflected past one edge of the bar to provide a single line image. The light deflected in the opposite direction still falls upon the bar due to the asymmetry above-mentioned. In a modification to this embodiment, that longitudinal part of each bar on which a minority of the intercepted band of light falls when the light-modulating medium is undeformed, comprises a transparent longitudinal edge portion shaped to deflect light falling thereon due to deformation of the medium in such manner as to enable the projection arrangement to bring light passing through the transparent edge portion and light deflected past the opposite edge portion to a common focus. Thus a single line image is achieved on the screen.

As will become clearer in the following detailed description the part of an output bar upon which a minority of light falls need not have light fall on it at all when the light-modulating medium is undeformed and the term "minority of light" is used herein to include the case where there is no light.

In another aspect the invention provides apparatus for producing images from a deformable, light-modulating medium by means of Schlieren optics, comprising a source of light; means cooperable with said source to produce bands of light for transmission to a deformable light-modulating medium; a plurality of spaced bars for selectively passing light modulated by said medium; means disposed in the light path between said light band-producing means and said source to focus said light bands upon different ones of said bars when said medium is undeformed; and a projection arrangement responsive to light passed by said bars when said medium is deformed to produce an image corresponding to the deformations of said medium, wherein each bar comprises a longitudinal inner portion for intercepting the light falling on the bar when the said medium is undeformed to prevent transmission of light to the projection arrangement, a pair of transparent edge portions flanking said inner portion, each of said edge portions being shaped to direct light falling thereon due to deformation of said medium to said projection arrangement in a manner enabling the light transmitted by the two edge portions to be brought to a common focus.

Figure 2A:
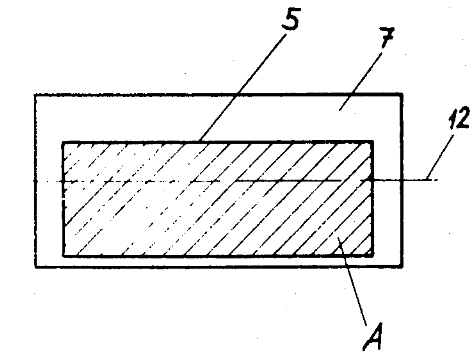
Figure 2B:
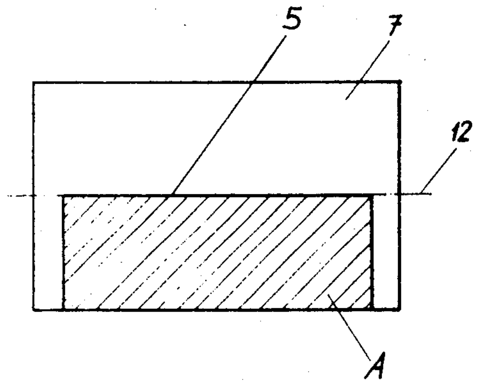
Figure 2C:
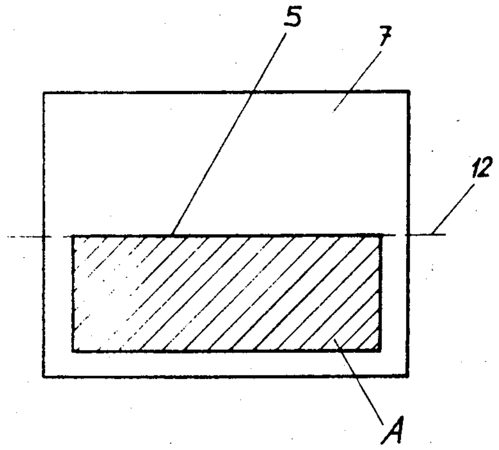
Figure 3:
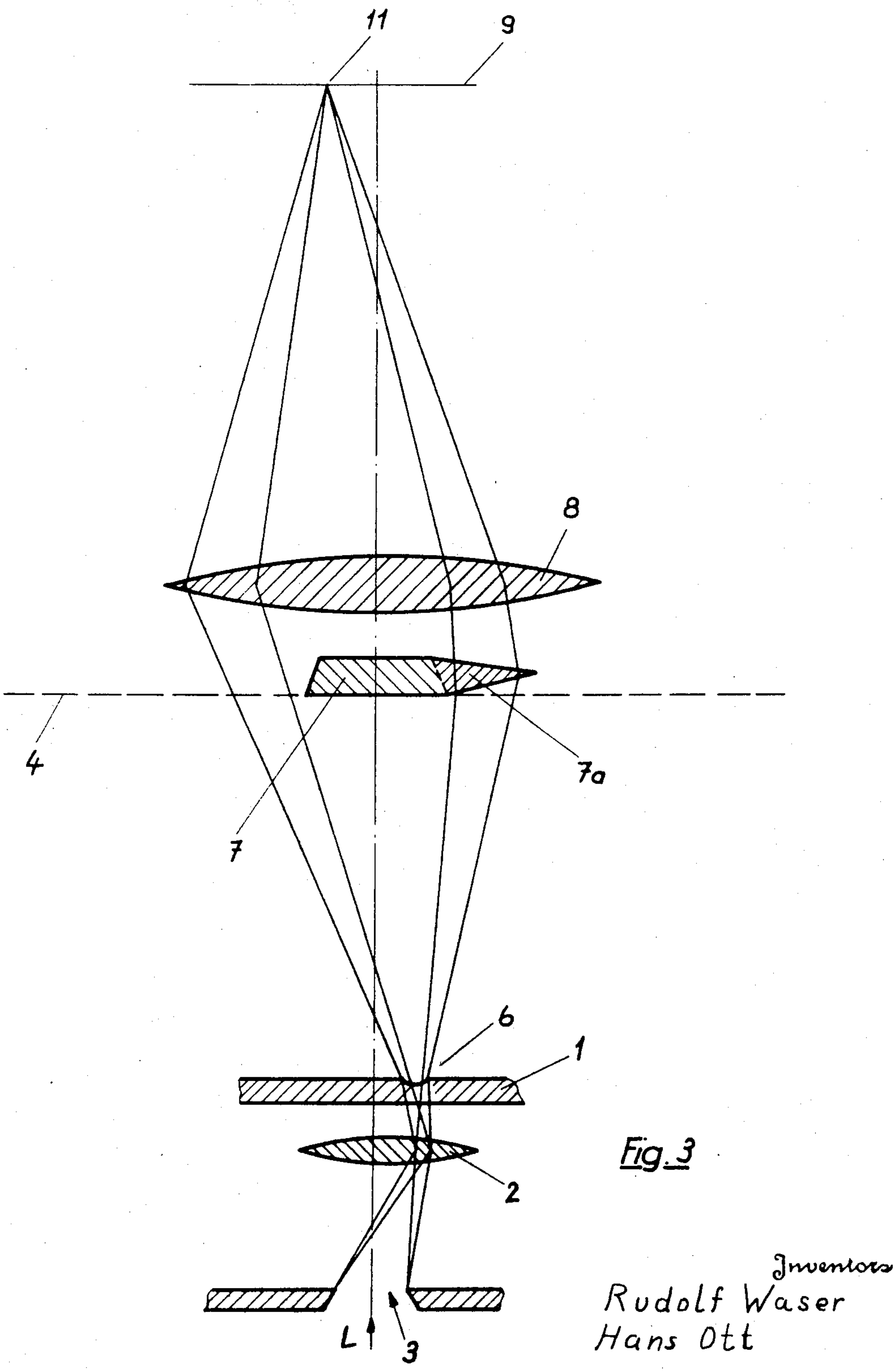

The invention and the manner of putting it into practice may be better understood from the following description of two embodiments thereof, given by way of example, and illustrated in the accompanying drawings in which:

FIG. 1 shows a first embodiment of the invention in a simplified schematic, cross-sectional representation;

FIGS. 2*a*, 2*b*, 2*c* are views of one of the output mask bars and of the images of an input mask slit on the bar with different width ratios when seen in projecting direction; and FIG. 3 shows a second embodiment, also in a simplified schematic cross-sectional representation.

Only those parts of the apparatus necessary to an understanding of the present invention are shown in the drawings and it is believed that there is no necessity to describe the remainder of the structure which would be within the purview of those skilled in this art.

Referring first to FIG. 1, the deformable surface of a modulating film 1 supported by means not shown is located in projecting direction L directly behind an optical system 2 which includes a combination of lenses arranged to form an image A of a slit 3 in a plane 4. A bar 7 in this image plane 4 intercepts the image-forming light when the film 1 is undeformed, the width of the bar being greater than the width of the image A of the slit 3. Behind the bar 7 is a further optical system which in the drawing comprises an objective lens 8 adapted to image the surface 1 of the modulating film on a projection screen 9. The slit 3 and bar 7 are portions of input and output masks respectively for selectively passing light (the remainder of the masks are like the portions shown and are omitted for simplicity). Each mask has a planar, alternate bar and slit configuration (spaced apart bars). The slits of the input mask produce bands of light and are imaged upon the bars of the output mask by lens 2. Such masks are shown in the prior patents already referred to.

One longitudinal edge portion of the bar 7 is widened beyond the side of the band of light representing the image A of slit 3. Light which passes through one side of a deformation 6 in the film 1 causes an image B to appear on this widened portion 7*a* of the bar 7. In the absence of this widened portion 7*a* of the bar, the light falling thereon would be focused at 10 on the projection screen, but because of the part 7*a* this light is intercepted before it reaches the objective 8. However, that part of the light which is transmitted through the other side of the deformation 6 on the surface 1 of the modulating film is deflected past the opposite unwidened side of the bar and this light therefore reaches the objective 8 and is focused on the projection screen 9 at 11.

Even a slight increase in the width of the bar 7 on one side of the image A of the slit 3 and the consequent asymmetrical location of the image A on the bar gives a considerable reduction in the intensity of the undesirable second projection at 10 due to the preferential deflection of light past one edge of the bar 7. For example, in FIG-2*a* there is illustrated a case where the dimensional proportions of the optical system are so chosen that the ratio of the width of the bar to the width of the image thereon is about 1.5:1. This ratio is quite satisfactory for a large number of applications in practice. By increasing this ratio and correspondingly increasing the asymmetry of the position of the image on the bar, the quality of reproduction obtainable by suppressing the duplicate outline can be further improved. In FIG. 2*b* the bar 7 is twice as wide as the image A of the slit and one longitudinal edge 5 of the image coincides with the longitudinal centre line 12 of the bar as seen in the direction L. In this arrangement the undesirable second projection (10 in FIG. 1) is suppressed to such an extent that it is practically no longer visible.

In FIG. 2*c* the bar 7 is more than twice as wide as the image A of the slit 3, and one longitudinal edge 5 of line 12 of the bar. By thus making the bar still wider, the demands made on the precision of the Schlieren-optical system are substantially reduced as well as the undesirable second projection at 10 being practically completely suppressed.

The embodiment of the invention illustrated in FIG. 3 differs from that in FIG. 1 substantially only in that the widened edge portion 7*a* of the bar 7 is arranged to function as a light-deflecting element which, as shown in the drawing, has the form of a transparent prism. This corrects the direction of the light incident on portion 7*a* of the bar in such a way that on the projection screen this light is focused at precisely the same spot as the light which the deformation 6 on the surface of the modulating film deflects past the opposite edge of the bar. The deformation 6 is formed by an electron beam modulated by a television video signal such that the image on the screen 9 is that of the television picture. The manner of deforming the light-modulating film 1 is well known in the art.

The above-described system permits lines to be written and optically reproduced on a large-sized screen without the undesirable doubling effect that appeared in the past.

It is also within the scope of the present invention so to contrive the bars that each has an opaque longitudinal inner portion flanked by edge portions both formed as transparent prisms so designed that light incident upon either of these two marginal prisms will be focused on thee same point of the projection screen.

It will be understood that the principles above-described are applicable to Schlieren-optical systems in which the slits are replaced by corresponding mirror strips on that side of the output bars which faces the light and the bars thus fulfill two functions.

What is claimed is:

1. Apparatus for producing images from a deformable, light-modulating medium by means of Schlieren optics, comprising a source of light; means cooperable with said source to produce bands of light for transmission to a deformable light-modulating medium; a plurality of spaced bars for selectively passing light modulated by said medium; means disposed in the light path between said light band-producing means and said source to focus said light bands upon different ones of said bars when said medium is undeformed; and a projection arrangement responsive to light passed by said bars when said medium is deformed to produce an image corresponding to the deformations of said medium, each of said bars having a width greater than that of the band of light falling thereon when said medium is undeformed, thereby preventing the transmission of light to the projection arrangement of said means for producing said bands of light, said light-modulating medium, and said bars all being so disposed with respect to each other that each band of light falls on its respective bar asymmetrically with respect to the longitudinal center line of the bar, as seen looking in the direction of the light falling on the bar.

2. Apparatus as defined in claim 1 in which said means for producing said bands of light comprises a mask defining a plurality of light-transmissive slits.

3. Apparatus as defined in claim 1 which is dimensionally proportioned such that the ratio of the width of each of said bars to the width of the band of light falling thereon, when said medium is undeformed, is at least 1.5:1.

4. Apparatus as defined in claim 1 which is dimensionally proportioned such that the ratio of the width of each of said bars to the width of the band of light falling thereon, when said medium is undeformed, is at least 2:1 and wherein one longitudinal edge of each band of light coincides with said longitudinal centre line of the bar on which that band of light falls.

5. Apparatus as defined in claim 1 wherein the longitudinal edge portion of each of said bars which has the greater distance from the light band reception area is transparent and so shaped as to deflect light falling thereon from the light source via the light-modulating medium due to deformation of said medium in such direction into the projection arrangement that the light passing through said transparent edge portion has a common focus with the light deflected past the opposite edge pcrtion.

6. Apparaus for producing images from a deformable light-modulating medium by means of Schlieren optics, comprising a source of light; means cooperable with said source to porduce bands of light for transmission to a deformable light-modulating medium; a plurality of spaced bars for selectively passing light modulated by said medium; means disposed in the light path between said light band-producing means and said source to focus said light bands upon different ones of said bars when said medium is undeformed; and a projection arrangement responsive to light passed by said bars when said medium is deformed to produce an image corresponding to the deformations of said medium, each of said bars having a width greater than that of the band of light falling thereon when said medium is undeformed, thereby preventing the transmission of light to the projection arrangement; said means for producing said bands of light, said light-modulating medium, and said bars all being so disposed with respect to each other that each band of light falls on its respective bar asymmetrically with respect to the longitudinal center line of the bar, as seen looking in the direction of the light falling on the bar; the longitudinal edge portion of each of said bars which has the greater distance from the light band reception area being transparent and having a prismatic shape to deflect light falling thereon from the light source via the light-modulating medium due to deformation of said medium in such direction into the projection arrangement that the light passing through said transparent prismatic edge portion has a common focus with the light deflected past the opposie edge porion.

7. Apparatus for producing images from a deformable, light-modulating medium by means of Schlieren optics, comprising a source of light; means cooperable with said source to produce bands of light for transmission to a deformable light-modulating medium; a plurality of spaced bars for selectively passing light modulated by said medium; means disposed in the light path between said light band producing means and said source to focus said light bands upon different ones of said bars when said medium is undeformed; and a projection arrangement responsive to light passed by said bars when said medium is deformed to produce an image corresponding to the deformations of said medium, each such bar comprising a longitudinal inner opaque portion for intercepting the light falling on the bar when said medium is undeformed to prevent transmission of light to the projection arrangement, and a pair of transparent edge portions flanking said inner portion, each of said edge portions being shaped to direct light falling thereon from the light source via the light-modulating medium due to deformation of said medium in such direction into the projection arrangement that the two light beams transmitted by the two edge pcrtions have a common focus.

8. Apparatus as defined in claim 7 for producing images from a deformable light-modulating medium by means of Schlieren optics wherein the pair of transparent edge portions flanking the inner opaque portion of each said bar have a prismatic configuration.

References Cited

UNITED STATES PATENTS 2,927,959 3/1960 Mast ............... 350—161

WILLIAM L. SIKES, Primary Examiner

U.S. Cl. X.R.

178—7.87